US012602227B2

(12) United States Patent
Wareus et al.

(10) Patent No.: US 12,602,227 B2
(45) Date of Patent: Apr. 14, 2026

(54) METHOD FOR ASSESSING QUALITY OF OPEN SOURCE PROJECTS

(71) Applicant: DEBRICKED AB, Malmo (SE)

(72) Inventors: Carl Emil Orm Wareus, Malmo (SE); Jonathan Skogeby, Stockholm (SE)

(73) Assignee: DEBRICKED AB, Malmo (SE)

( * ) Notice: Subject to any disclaimer, the term of this patent is extended or adjusted under 35 U.S.C. 154(b) by 378 days.

(21) Appl. No.: 18/026,301

(22) PCT Filed: Oct. 12, 2021

(86) PCT No.: PCT/EP2021/078170
§ 371 (c)(1),
(2) Date: Mar. 14, 2023

(87) PCT Pub. No.: WO2022/079023
PCT Pub. Date: Apr. 21, 2022

(65) Prior Publication Data
US 2023/0367591 A1 Nov. 16, 2023

(30) Foreign Application Priority Data
Oct. 13, 2020 (SE) .................................. 20511192-9

(51) Int. Cl.
*G06F 9/44* (2018.01)
*G06F 8/77* (2018.01)
(52) U.S. Cl.
CPC ...................................... *G06F 8/77* (2013.01)
(58) Field of Classification Search
CPC ........................................................ G06F 8/77
See application file for complete search history.

(56) References Cited

U.S. PATENT DOCUMENTS 10,657,023 B1 * 5/2020 Willson ..................... G06F 8/77
2016/0202972 A1 * 7/2016 Sass ........................... G06F 8/75
717/121

(Continued)

OTHER PUBLICATIONS

International Search Report and Written Opinion; PCT/EP2021/078170; Mailed Jan. 25, 2022; 15 pages.

(Continued)

*Primary Examiner* — Qamrun Nahar
(74) *Attorney, Agent, or Firm* — Sheridan Ross P.C.

(57) ABSTRACT

A method (300) for determining latent variables related to quality of an open source project. The method (300) comprising extracting (S302) open source project data (106) related to the open source project from one or more databases (102), determining (S304) one or more absolute features (108) from the open source project data (106) according to pre-set rules, retrieving (S306), for each absolute feature (108), a transform (110) related to a probability distribution, wherein the transform (110) is determined based on a multitude of open source projects, transforming (S308) the one or more absolute features (108) into one or more relative features (112) by using the transform (110) of each absolute feature (108), weighting (S310) the one or more relative features (112) using a first set of weights (114), thereby forming one or more weighted relative features, determining (S312) one or more practices (116), each related to a quality aspect of the open source project, as one or more sums of combinations of the one or more weighted relative features.

20 Claims, 7 Drawing Sheets

(56) References Cited

U.S. PATENT DOCUMENTS

2016/0283893 A1* 9/2016 Dhiman ................. G06Q 10/06
2016/0307133 A1* 10/2016 Kour ................ G06Q 10/06313

OTHER PUBLICATIONS

Jarczyk Oskar et al: "GitHub Projects; Quality Analysis of Open-Source Software"; Nov. 11, 2014 (Nov. 11, 2014),; Advances in Biometrics : International Conference, ICB; 2007, Seoul, Korea, Aug. 27-29, 2007; pp. 80-94.
Munaiah Nuthan et al: "Curating GitHub for engineered software projects"; Empirical Software Engineering; vol. 22, No. 6, Apr. 18, 2017 (Apr. 18, 2017); pp. 3219-3253.
Raymond PL Buse et al: "Learning a Metric for Code Readability"; IEEE Transactions on Software Engineering; IEEE Service Center, Los Alamitos, CA, US; vol. 36, No. 4, Jul. 1, 2008.

* cited by examiner

200

Server 200

Memory 208

Extracting function
210

First determining
function
212

Transforming
function
214

First weighting
function
216

Second determining
function
218

Second weighting
function
220

Third determining
function
222

Control Unit 204

Processor 206

Tranceiver 202

300

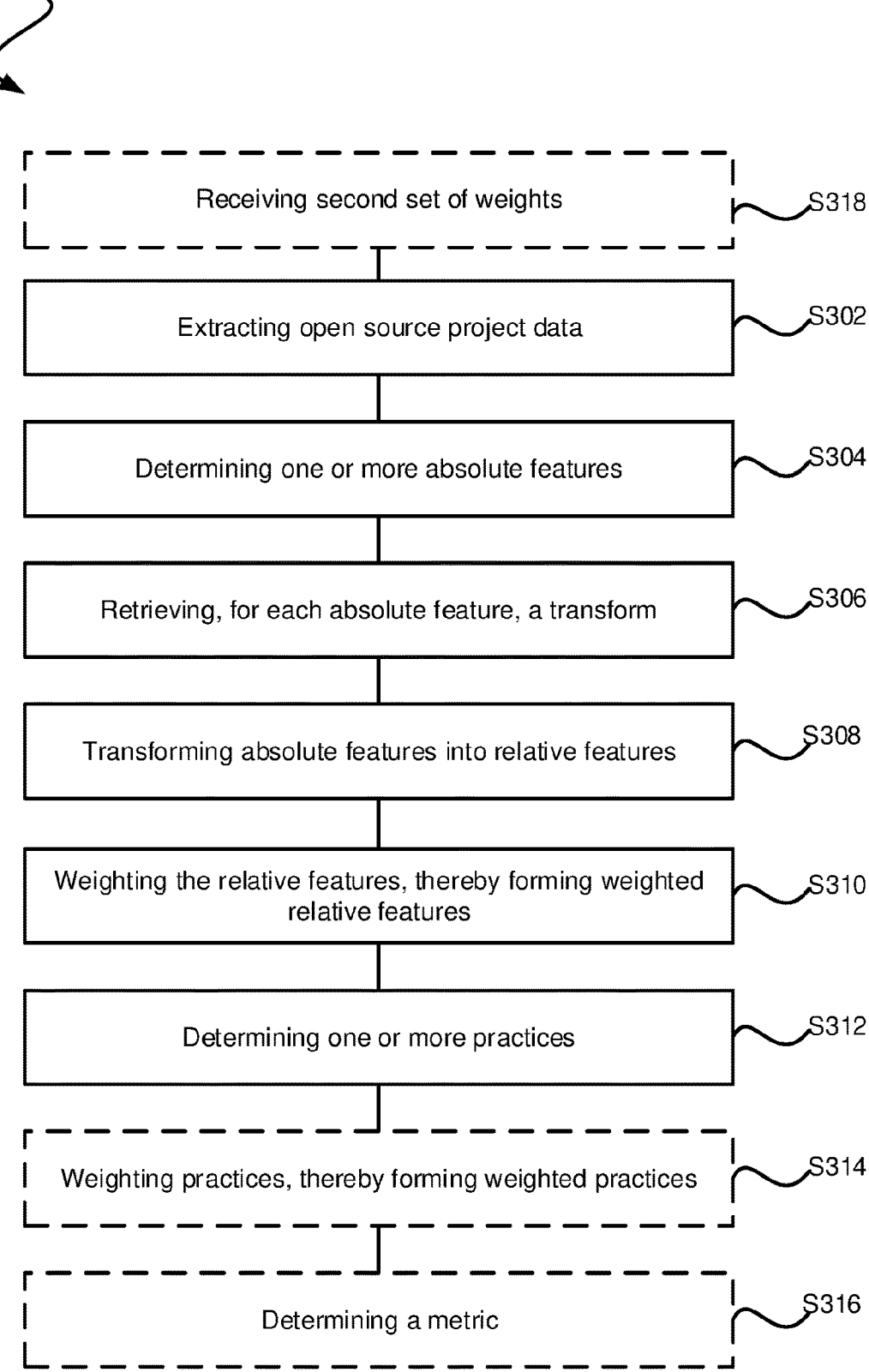

Receiving second set of weights    S318

Extracting open source project data    S302

Determining one or more absolute features    S304

Retrieving, for each absolute feature, a transform    S306

Transforming absolute features into relative features    S308

Weighting the relative features, thereby forming weighted relative features    S310

Determining one or more practices    S312

Weighting practices, thereby forming weighted practices    S314

Determining a metric    S316

METHOD FOR ASSESSING QUALITY OF OPEN SOURCE PROJECTS

TECHNICAL FIELD

The disclosure relates to software development and IT security in general. More particular, it is related to a method for assessing quality of open source projects.

BACKGROUND

In almost all software development today, using open source and third-party components is crucial for its success. It is beneficial to the quality, security, functionality, and development efficiency. However, there are challenges in efficiently managing open source for organizations in terms of security, licensing, and measuring the quality of the imported open source projects. Common activities are evaluating a portfolio of open source projects, comparing open source projects, and enforcing policies to reduce the quality related risks associated with open source.

In terms of determining the quality of an open source project, the data is scattered across different data sources, such as GitHub, Stackoverflow, Google, NVD, package managers, and more. This makes this a cumbersome challenge, both in terms of evaluation of the software metrics, and getting access to good quality data.

It is therefore need for improved method and systems for assessing quality of open source project in a better and more time efficient way.

SUMMARY

It is an object of the invention to at least partly overcome one or more of the above-identified limitations of the prior art. In particular, it is an object to provide a method for assessing quality of open source projects, and a server and system thereof.

The quality of an open source project is typically a latent variable. Put differently, it is a variable that are not directly observable, but rather inferred from other variables. It has been realized that by taking a more quantitative approach, where each measured entity may only bring implicit signal to a metric, and many measurements in unison can together form a representation of a latent open source software (OSS) metric that is built from many independent hypothesises, a benefit of completeness, accuracy, and resolution is achieved. This is different compared to other approaches where metrics are more qualitative, but significantly reduces the transparency and possibility of project-coverage, as many open software's simply do not fit into their quality model.

The proposed method is also relative, meaning that the absolute value of a measurement may not bear any meaningful insight out of the relative context. This approach plays well into the quantitative approach, where it is insightful to analyse a group of OSS projects and compare portfolios of open source.

According to a first aspect, a computer-implemented method for determining one or more latent variables related to quality of an open source project is provided. The method may comprise, extracting open source project data related to the open source project from one or more databases, determining one or more absolute features from the open source project data according to pre-set rules,

retrieving, for each absolute feature, a transform related to a probability distribution, wherein the transform may be determined based on a multitude of open source projects, transforming the one or more absolute features into one or more relative features by using the transform of each absolute feature, weighting the one or more relative features using a first set of weights, thereby forming one or more weighted relative features, determining one or more practices, each related to a quality aspect of the open source project, as one or more sums of combinations of the one or more weighted relative features.

The open source project may be interpreted as a set of computer programs, openly available to the public. It may for instance be available through a GitHub repository.

The quality of an open source project may be interpreted as a measure of how "good" or "bad" the open source project is from different aspects. The evaluation could be used as grounds for deciding between open source projects.

The open source project data may be interpreted as raw data related to the open source project, not necessarily related to the code itself. As a non-limiting example, it may be statistical data about what or how many contributors are working on the project or how fast issues are solved. Another example includes consumer ratings of the open source project or other popularity measures. The one or more databases of open source project data may include, but are not limited to, online repositories such as GitHub, package managers, vulnerability databases such as National Vulnerability Database (NVD) and online websites such as Stack Overflow.

The absolute features may be interpreted as results from processing the raw data that is the open source project data according to the pre-set rules. That is, the act of determining one or more absolute features from the open source project data according to pre-set rules may be understood as determining a (respective) value of one or more absolute features (i.e. one or more absolute feature values) of the open source project data according to the pre-set rules. Each pre-set rule may result in an absolute feature by combining different types of open source project data. The complexity of the absolute features may vary from simple values (e.g. explicitly included in the open source project data) such as the number of stars of the open source project, to more complex calculations such as skew of developer commitment. The absolute features are absolute in that they are not put into relation to other open source projects.

The transform may be interpreted as a way of projecting the absolute feature onto the probability distribution. The probability distribution is connected to a feature and is therefore the same for every open source project that is assessed. The probability distribution may for instance be a normal distribution.

The relative features are relative in that they are put into relation to other open source projects. By putting the values of the features in the context of other open source projects, the values of the relative features may give a better meaning to how "good" or how "bad" an open source project is. In other words, the relative features may be seen as contextualized features. It is also advantageous in that increments in the values of the absolute features should maybe not be weighted equally. For instance, an increase of 100 stars for an open source project of 10 stars may be more valuable than an increase of 100 stars for an open source project with 10 000 stars already.

By weighting the relative features, they can be scaled differently depending on how important they are for the quality assessment.

The practices may be latent variables that can be viewed as desirable properties or good practices in an open source project. The practices may be used as a measure of the quality of the open source project. Accordingly, each practice may define a latent variable representing a measure of the quality of the open source project.

The practices, which can be seen as an aggregation of features, may be tuned both in terms of which features to include for a particular practice as well as how the different features should be weighted, i.e. their impact on the practice in question.

The proposed method may be advantageous in that it provides a quality assessment from multiple dimensions and in a more explainable way for a user.

The term contributor may be interpreted as a person producing the open source project. The contributor may for instance be the owner of the open source project, or part of a team developing the open source project, thus a contributor may be a developer. The term open source software (OSS) consumer may be interpreted as a person consuming the open source project, i.e. using the parts or the whole of the open source project in their own project. A person may be both a contributor and an OSS consumer at different points of time. The term user may be interpreted as a person using the proposed method or system. The user may be either an OSS consumer, contributor or both.

The method may further comprise, weighting the one or more practices using a second set of weights, thereby forming one or more weighted practices, determining a metric, related to a quality aspect of the open source project, as a sum of the one or more weighted practices.

The metric may be a latent variable that can be viewed as a measure of the quality of the open source project, at a higher abstraction level than practices.

By weighting the practices, they can be scaled differently depending on their importance for the quality of the open source project.

An advantage of determining a metric may be that even more dimensions can be weighed in into the result. It has been found that having this three-tier approach provides for that quality of the open source project can be assessed reliably. In other words, each metric determined in this manner may define a latent variable related to a quality aspect of the open source project.

The terms "practice" and "metric" as described above may also be referred to as "a first level metric" and "a second level metric", respectively.

Each of the one or more relative features may be scaled to a pre-determined scale. As an example, the pre-determined scale can be 0 to 1000, where 1000 is the desired top score. This may be advantageous in that the features can more easily be compared to each other by a user.

The one or more absolute features may be selected from a group consisting of Closed Issues Trend, Commits Trend, Company Involvement, Contribution Skew, Contributor Influence, Contributor Trend, Core Team Commits Trend, Core Team Issue Closing, Developers per Commit, Developer Lifetime, Developer Velocity, External Pull Requests, Issues Trend, Closed Issues per Developer, Loyal Developer Commits, Merges Trend, New Contributors, Pull Request Trend, Pull Requests Merged per Developer, Recently Closed Issues, Recent Commits, Recent Core Team Commits, Recent Issues, Recent Merges, Recent Pull Requests, Total Contributors, Total Forks, Total Stargazers, Total Watchers, Vulnerability Disclose to Patch, Vulnerability Entry to Disclosure, Severity Adjusted Vulnerability Disclose to Patch, Issue Vulnerability Days Open, Issue Vulnerability Comment Rate, Issue Vulnerability Entry to Issue, Vulnerability Time Series Distribution, Number of Vulnerabilities, Issue Vulnerability Rate, Acceptable Developer Velocity, Repository Size, Repository Size Adjusted Amount of Vulnerabilities, Repository Size Adjusted Amount of Bug Reports, Commit Size, Security Processes Badges, Security Vulnerability Badges, Issue Vulnerability Reporting, Review Policy Configure, Test Coverage, Core Infrastructure Initiative, Mean Vulnerability Severity, Security Awareness, Exploitability, Dead Issue Rate, Read Issue Vulnerabilities Rate, Maintainer Responsiveness and any combinations thereof. Further types of absolute features are possible as well.

A combination found efficient is that of Security Awareness, Issue Vulnerability Reporting, Vulnerability Time Series Distribution, Vulnerability Disclose to Patch and Vulnerability Entry to Disclosure.

The one or more practices may be selected from a group consisting of Contributor Experience, Contributor Efficiency, Contributor Diversity, Contributor Activity, Core Team Commitment, Contributor Longevity, Usage, Developer Popularity, Community Activity, Ecosystem Buzz, Vulnerability Response, Vulnerability Entry, Security Best Practice, Vulnerability Severity, Security Sensitive Activity and any combinations thereof. Further types of practices are possible as well.

The metric may be selected from a group consisting of Security, Contributor and Popularity. Further types of metrics are possible as well.

The transform may be determined by, for each feature, determining a set of absolute feature values from the multitude of open source projects, removing outliers of the absolute feature values from the set, projecting the absolute feature values of the set onto the probability distribution, and, determining the transform that projects the absolute feature values of the set onto the probability distribution.

Outliers may be interpreted as values that are abnormally small or large, in relation to the other values. Removing them may be advantageous in that the transform can be more representative of the values, giving more accurate results.

The transform may be a Quantile Transform. The Quantile Transform is a known technique and should be interpreted as a way of projecting a numeric input variable to a certain probability distribution. The transform may be a Power Transformer.

The outliers may be removed by using the Isolation Forest method. Isolation Forest is an efficient technique for isolating outliers, even if the amount of data varies over time. Alternatively, values may be considered as outliers and removed if they are outside a predetermined interval, allowing the transform to better fit the probability distribution of the corresponding absolute feature.

The first set of weights may comprise one or more subsets of weights, wherein each subset of weights may be related to one of the practices, and wherein each subset of weights may be determined such that they maximize the standard deviation of respective practice based on a multitude of open source projects.

An advantage of determining the weights such that the standard deviation of each practice is maximized may be that the practices are more differentiable between open source projects.

The method may further comprise receiving the second set of weights from a user device, reflecting user preferences. This may be interpreted as a way of contextualizing the quality assessment of the open source project that the user wants to assess.

The user device may be a computer or any other means suitable for providing user input. An advantage of receiving user input may be that the basis for assessing the quality of the open source project can be contextualized for the user. Put differently, the results may be adapted to the preferences of the user.

According to a second aspect, a server configured for determining one or more latent variables related to quality of an open source project is provided. The server may comprise a transceiver, a control unit and a memory, wherein the transceiver may be configured to:

retrieve, for each absolute feature, a transform related to a probability distribution, wherein the transform may be determined based on a multitude of open source projects, wherein the control unit may be configured to execute:

an extracting function, configured to extract open source project data related to the open source project from one or more databases, a first determining function, configured to determine one or more absolute features from the open source project data according to pre-set rules, a transforming function, configured transform the one or more absolute features into one or more relative features by using the transform of each absolute feature, a first weighting function, configured to weight the one or more relative features using a first set of weights, thereby forming one or more weighted relative features, a second determining function, configured to determine one or more practices, each related to a quality aspect of the open source project, as one or more sums of combinations of the one or more weighted relative features.

The control unit may be further configured to execute, a second weighting function, configured to weight the one or more practices, using a second set of weights, thereby forming one or more weighted practices, a third determining function, configured to determine a metric, related to a quality aspect of the open source project, as a sum of the one or more weighted practices.

The transceiver may be further configured to receive the second set of weights from a user device, reflecting user preferences.

According to a third aspect, a non-transitory computer-readable storage medium is provided. The non-transitory computer-readable storage medium may have stored thereon program code portions for implementing the method according to the first aspect when executed on a device having processing capabilities.

According to a fourth aspect, a system for determining latent variables related to quality of an open source project is provided. The system may comprise, a server according to the second aspect, one or more databases, comprising open source project data, wherein the one or more databases may be communicatively connected to the server.

The system may further comprise a user device for receiving the second set of weights, reflecting user preferences.

Still other objectives, features, aspects and advantages of the invention will appear from the following detailed description as well as from the drawings. The same features and advantages described with respect to one aspect are applicable to the other aspects unless explicitly stated otherwise.

BRIEF DESCRIPTION OF THE DRAWINGS

Embodiments of the invention will now be described, by way of example, with reference to the accompanying schematic drawings, in which

FIG. 3 is a flowchart of a method for determining latent variables for assessing quality of an open source project.

DETAILED DESCRIPTION

Figure 1:
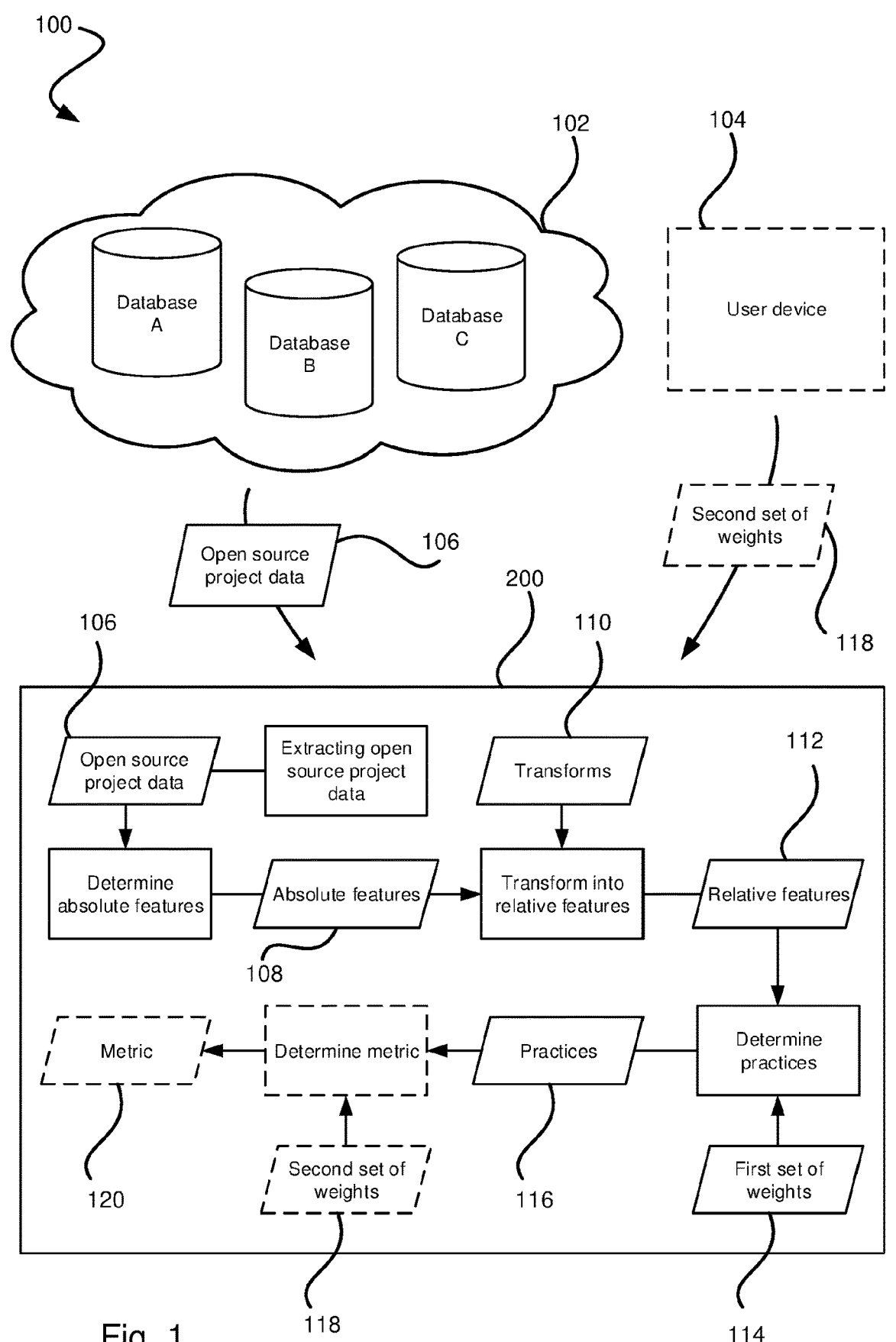
FIG. 1 illustrates a system for determining latent variables for assessing quality of an open source project.

FIG. 1 illustrates a general principle of a system 100 for determining latent variables for assessing quality of an open source project.

The system 100 may comprise a server 200 configured for determining latent variables for assessing quality of an open source project. The server 200 is further described in connection to FIG. 2.

The system 100 may further comprise one or more databases 102 comprising open source project data 106, wherein the one or more databases 102 may be communicatively connected to the server 200.

The system 100 may further comprise a user device 104, communicatively connected to the server 200. The server 200 may receive a second set of weights 118 from the user device 104. This allows the system 100 to receive input from a user to contextualize the results for the user.

The server 200 may extract open source project data 106 from the one or more databases 102. From the open source project data 106, one or more absolute features 108 may be determined according to pre-set rules. A transform 110 related to a probability distribution may be retrieved for each absolute feature 108. The transform 110 may be provided within the server 200. Alternatively, it may be retrieved from an external source, such as another server or a database. The transform 110 may be determined based on a multitude of open source projects. The absolute features 108 may be transformed into relative features 112 by using the transform 110 related to each feature. By doing so, the features are put in relation to other open source projects. The relative features 112 may be scaled to a pre-determined scale. In case the pre-determined scale is from 0 to 1000, the features may be scaled according to, $$f_{i;scaled} = \frac{f_i - f_{min}}{f_{max} - f_{min}} * 1000$$

where f is a particular feature from the feature set F, and i denotes an entry for that feature derived form one open source project.

The relative features 112 may be weighted using a first set of weights 114, thereby forming weighted relative features. One or more practices 116 may be determined as one or more sums of combinations of weighted relative features. This may be formulated as, $$p_k = \sum_{i}^{i \in k} [w_{i:k} f_{i:k}]$$

with the constraint $$\sum_{i}^{i \in k} [w_{i:k}] = 1,$$

where $p_k$ denotes the practice k, i denotes the value of the relative feature i, and $i \in k$ denotes all features i that contribute to practice k. The constraint may be interpreted as that the sum of all weights belonging to a practice should sum to 1. The weights may be further constrained in that a maximum underweight of 50% and overweight of 100% may be allowed from a uniform value. For example, if we have five features in a practice, the uniform weight would be 0.20, which would give a minimum weight of 0.1, and a maximum weight of 0.4. Each set of weights belonging to a practice may be determined such that the standard deviation, or variance, of the practice is maximized with respect to the weights as variables based on a multitude of open source projects. The open source projects may be of different programming languages. This may be done so that the practices are more differentiable between open source projects, thereby giving actionable results.

Similarly, the practices 116 may be weighted using the second set of weights 118, thereby forming weighted practices. The weighted practices may be summed to determine a metric 120. The second set of weights 118 may be received from the user device 104. Alternatively, the second set of weights 118 may be set by open source professionals.

The transformation between an absolute feature 108 and a relative feature 112 involves projecting the absolute feature value onto a probability distribution unique to that feature. The transform 110 may be determined by using a multitude of open source projects. A set of absolute feature values may be determined from the multitude of open source projects. In particular, the set of absolute feature values may be determined from the multitude of open source projects such that each value of the set of absolute feature values is the value of the absolute feature for a respective one of the multitude of the multitude of open source projects. It is hereby to be understood that the absolute feature considered is the same among the multitude of the multitude of open source projects.

Outliers among the absolute feature values may be removed from the set. This may be done by using the Isolation Forest method.

The set of the remaining absolute feature values may be projected onto a probability distribution, and the transform 110 doing so may be determined. The transform 110 may be a Quantile Transform.

Isolation Forest and Quantile Transform are both known methods. For increased understanding they are described below.

Isolation Forest is a tree-based anomaly detection algorithm with desirable properties, such as lower memory usage and linear time complexity as it targets possible anomalies, rather than comparing all entries to some normality. These properties, together with high performance with minimal tuning makes it an attractive algorithm, as each feature and language combination need a separately trained instance of the algorithm.

Anomalies for a given set of data $X=X_1, \ldots, X_n$ of n samples from a d-variate distribution are calculated form the leafs' distance to root (path length) in a proper binary tree. The tree is optimized to be fully grown, meaning that each leaf only contains one or identical entries, or until a max depth is reached, which is a hyperparameter in the algorithm. The path length h(x) is calculated as the number of edges x travels to its final node from the root of the tree. To normalize h(x), the average of h(x), c(n), is estimated as, $$c(n)=2H(n-1)-(2(n-1)/n),$$

where n is the number of external nodes in the tree, and H(i) is the harmonic number estimated as $/n(i)+0.5772156649$ (Euler's constant). The normalized h(x), s(x,n) is derived from , $$s(x, n) = 2^{-\frac{E(h(x))}{c(n)}}$$

where E(x) is the average h(x) from an ensemble of trees in a forest. When s is approaching 1 for a particular value, it can be considered an anomaly. If s is much smaller than 0.5, it can safely be considered a normal instance.

The Isolation Forest is used to find anomalies in raw feature scores to make transforms, which will be further elaborated below, less prone of overfitting to long tail distributions and special projects that may present extremely high scores in single features. Anomalies are removed from the training sequence of the Quantile Transformer, but still predicted upon during inference.

Quantile Transformer is a technique to project any distribution onto a normal distribution. The property of normally distributed data is appealing to the proposed method, as we want the output results to be actionable, comparable, and bring differentiating signal for analysis. Projecting any distribution to a normal distribution solves the problem that different ranges in the underlying distribution should scale in a none-linear way to an actionable score. The Quantile Transformer is a monotonic transformations, which means that it preserves the rank of the values for a particular feature. The features are projected from the formula $$5^{-1}(F(X)),$$

where F is the cumulative distribution function the underlying feature, and $G^{-1}$ is the quantile function of the normal distribution G. This assumes that (1) X is a continuous random variable with a cumulative distribution function F, then F(X) is uniformly distributed on [0, 1]. (2) U is a random variable on [0, 1], then $G^{-1}$ has a normal distribution G. In practice, the quantile transformer splits X into n quantiles, and scales and interpolates the contents of each quantile to fit a normal distribution.

The steps described in connection to FIG. 1 is further described in connection to FIG. 3.

Figure 2:
FIG. 2 illustrates a schematic view of a server for determining latent variables for assessing quality of an open source project.

FIG. 2 illustrates a schematic view of a server 200. The server 200 may be configured for determining latent variables related to, or suitable for assessing, quality of an open source project. The server 200 comprises a transceiver 202, a control unit 204 and a memory 208.

The transceiver 202 may be configured to enable the server 200 to communicate with other devices, such as external databases. The transceiver 202 may be configured to retrieve, for each absolute feature 108, a transform 110 related to a probability distribution, wherein the transform 110 may be determined based on a multitude of open source projects.

The control unit 204 may be configured to perform the control of functions and operations of the server 200. The control unit 204 may include a processor 206, such as a central processing unit (CPU). The processor 206 can be configured to execute program code stored in the memory 208, in order to perform functions and operations of the server 200.

The control unit 204 may execute an extracting function 210. The extraction function 210 may be configured to extract open source project data 106 related to the open source project from one or more databases 102.

The control unit 204 may execute a first determining function 212. The first determining function 212 may be configured to determine one or more absolute features 108 from the open source project data 106 according to pre-set rules.

The control unit 204 may execute a transforming function 214. The transforming function 214 may be configured to transform the one or more absolute features 108 into one or more relative features 112 by using the transform 110 of each absolute feature 108.

The control unit 204 may execute a first weighting function 216. The first weighting function 216 may be configured to weight the one or more relative features 112 using a first set of weights 114, thereby forming one or more weighted relative features.

The control unit 204 may execute a second determining function 218. The second determining function 218 may be configured to determine one or more practices 116, each related to a quality aspect of the open source project, as one or more sums of combinations of the one or more weighted relative features.

Optionally, the control unit 204 may execute a second weighting function 220. The second weighting function 220 may be configured to weight the one or more practices 116, using a second set of weights 118, thereby forming one or more weighted practices.

Optionally, the control unit 204 may execute a third determining function 222. The third determining function 222 may be configured to determine a metric 120, related to a quality aspect of the open source project, as a sum of the one or more weighted practices.

Optionally, the transceiver 202 may be further configured to receive the second set of weights 118 from a user device 104, reflecting user preferences.

FIG. 3 is a flowchart illustrating the steps of a computer-implemented method 300 for determining one or more latent variables related to, or suitable for assessing, quality of an open source project.

In a first step S302, open source project data 106 related to the open source project may be extracted from one or more databases 102.

In a second step S304, one or more absolute features 108 may be determined from the open source project data 106 according to pre-set rules. In particular, a value of each of the one or more absolute features may be determined.

In a third step S306, a transform 110 related to a probability distribution may be retrieved for each absolute feature 108, wherein the transform 110 is determined based on a multitude of open source projects. In other words, a transform 110 may be retrieved for each of the one or more absolute features of which a value is determined.

In a fourth step S308, the one or more absolute features 108 may be transformed into one or more relative features 112 by using the transform 110 of each absolute feature 108. In particular, each absolute feature value may be transformed into a relative feature value.

In a fifth step S310, the one or more relative features 112 may be weighted using a first set of weights 114, thereby forming one or more weighted relative features. In particular, the values of the one or more relative features may be weighted.

In a sixth step S312, one or more practices 116, each related to a quality aspect of the open source project, may be determined as one or more sums of combinations of the one or more weighted relative features. In particular, values of the one or more weighted relative features are summed into one or more practices.

Optionally, in a seventh step S314, the one or more practices 116 may be weighted using a second set of weights 118, thereby forming one or more weighted practices. Put differently, values of the practices may be weighted, thereby forming values of the one or more weighted practices.

Optionally, in an eighth step S316, a metric 120 related to a quality aspect of the open source project may be determined as a sum of the one or more weighted practices. Put differently, the metric may be determined as a sum of the values of the one or more weighted practices.

Optionally, in a nineth step S318, the second set of weights 118 may be received from a user device 104, reflecting user preferences.

Even though described in a certain order, the different steps may also be performed in other orders, as well as multiple times such as determining multiple metrics from one or more weighted practices.

Figure 4:
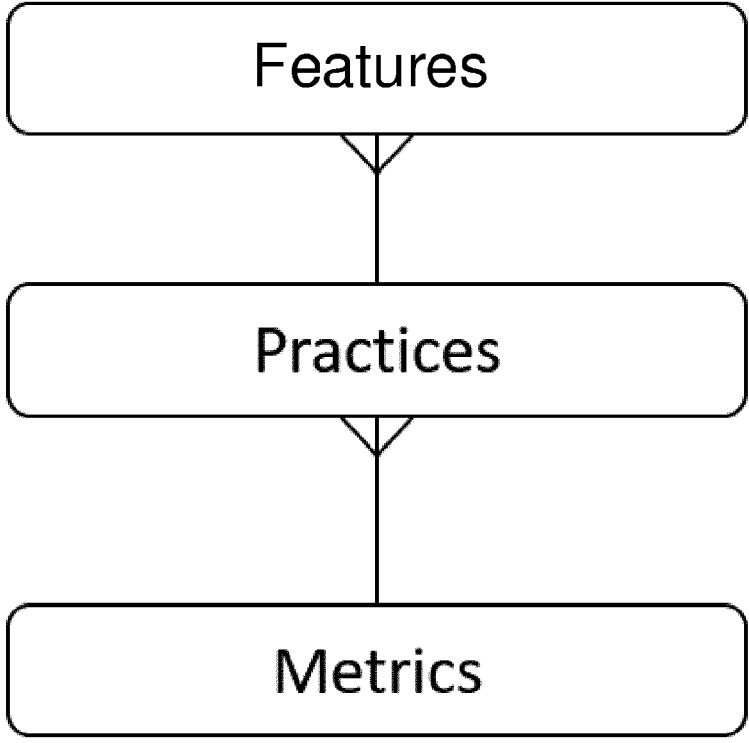
FIG. 4 illustrates the relationship between features, practices and metrics.

FIG. 4 illustrates the relationship between features, practices and metrics by way of example. The term feature may herein refer to both absolute feature 108 and relative feature 112. Features may use raw data to calculate values that bare signal to practices. Practices may represent latent variables that are attractive to know as an open source consumer. Metrics may aggregate practices that processes similar areas of interest into one abstract representation of one certain dimension of an open source project, such as security.

The practice to feature relation may be understood as a one-to-many relation. Put differently, one practice is determined as a weighted sum of one or more features. Any number and type of features may be combined into a practice. In other words, different practices may be determined by summing different combinations of features.

The metric to practice relation may be understood as a one-to-many relation. Put differently, one metric is determined as a weighted sum of one or more practices. Different metrics may be determined from sums of different practices.

A number of desirable features are described in more detail below. Other features that in some way reflect a quality aspect of an open source project are possible as well.

Closed issues trend. Feature to measure the linear trend of the number of issues closed per week, that is, if the number is increasing or decreasing. This may be useful because closed issues are important to measure since it tells you if upcoming bugs, ideas and problems are being addressed by the maintainers. With the trend of issues closing, it may be possible to naively tell if the number of closed issues per week is increasing or decreasing. The feature may be calculated as the slope (derivative) of the linear regression line fitted to the weekly number of closed issues the past x weeks, where x is the look-back variable. Put differently, the Closed Issues Trend feature may be the trend of the number of closed issues.

Commits trend. Feature to measure the linear trend of commits pushed to the master branch, that is, if the number is increasing or decreasing. This may be useful because commits play a central role in estimating the activity of a project. Lack of recent commits to the master branch may be a symptom of an inactive community, absent maintainers, deprecation, etc. The trend of commits per week enables you to tell if the number is increasing or decreasing. Calculated as the slope (derivative) of the linear regression line fitted to the weekly number of created commits the past x weeks, where x is the look-back variable. Put differently, the Commits Trend feature may be the trend of the number of commits.

Company involvement. Feature to measure how much involvement in the project there is from a company. This may be useful because projects with a clear representation of committers from the same company might indicate that said company is investing resources into the project. Calculated as the highest ratio of unique committers from the same company the past x weeks, where x is the look-back variable. Put differently, the Company Involvement feature may be the amount of involvement of developers linked to the company, e.g. employees of the company.

Contribution skew. Feature to measure the skewness contributions between the developers, meaning how the volume of pull requests are divided between the contributors. A highly positive skew means that the pull requests are evenly distributed between the contributors, while a highly negative skew means that a handful of contributors stands for most of the pull requests. This may be useful because a high number of contributors is good for many reasons but may be misinterpreted if a few contributors is doing all the work. The contribution skew feature is a practical method of validating if the contributions are productively distributed. Calculated as the statistical skewness of the number of pull requests each contributor made the past x weeks, where x is the look-back variable. Put differently, the Contribution skew feature may be the skewness contributions between the developers.

Contributor influence. Feature to measure the influence the contributors have, meaning how much attention they draw to the project. This may be useful because influential contributors highlight the repository to their followers on GitHub by notifying them whenever they make a pull request to that repository, which in turn could lead to an increase in contributors and the overall community. A repository should be understood to be able to hold an open source project. The repository is therefore directly linked to the open source project. Calculated as the number of pull requests a certain developer has made the past x weeks, where x is the look-back variable, multiplied with their follower count and summing over all developers. Put differently, the Contributor influence feature may be the influence the contributors have.

Contributor trend. Feature to measure the linear trend of the number of active contributors. This may be useful because from this information you can forecast the activity of the contributors in the near future. Calculated as the slope (derivative) of the linear regression line fitted to the weekly number of active contributors the past x weeks, where x is the look-back variable. Active meaning that a contribution (pull-request) has been made within that week. Put differently, the Contributor trend feature may be the trend of the number of active contributors.

Core team commits trend. Feature to measure the linear trend of the number of commits made by core team members per week, that is, if the number is increasing or decreasing. This may be useful because the core developers' activity is key for progress. Measuring their commits is a good indicator of how involved they are in the project. By looking at the trend we can get an idea of whether their activity is increasing or decreasing. Calculated as the slope (derivative) of the linear regression line fitted to the weekly number of commits made by contributors who can merge pull requests, the past x weeks, where x is the look-back variable. Put differently, the Core team commits trend feature may be the trend of the number of commits made by the core team. The core team may be interpreted as a subset of the contributors of the open source project, who are heavily involved in the development.

Core team issue closing. Feature to measure the number of issues the core team has recently closed. This may be useful because the core developers' activity is key for progress. Measuring their responsiveness to issues is a good indicator of how involved they are in the project. Calculated as the number of issues closed by contributors who can merge pull requests, the past x weeks, where x is the look-back variable. Put differently, the Core team issue closing feature may be the number of issues the core team has recently closed.

Developers per commit. Feature to measure the arithmetic mean of developers per commit over the lifetime of the project. This may be useful because a healthy and diverse project should have many developers looking over the code base which is good for collective ownership and a sign of maintainability. Calculated as the total number of contributors divided by the total number of commits. Put differently, the Developers per commit feature may be the average number of developers per commit over the lifetime of the open source project.

Developer lifetime. Feature to measure how long the developers, on average, are actively contributing to the project. This may be useful because two developers who have contributed actively for ten months have probably done more for the project than ten developers who have contributed to the project for two months. Calculated as the consecutive weeks of activity of a moving window, averaged between all contributors. The window has a length of x weeks where the contributor is marked as active if at least y weeks of that window includes at least one commit. x and y are the activity window and activity threshold variables, respectively. Put differently, the Developer lifetime feature may be the average time the developers are actively contributing to the open source project.

Developer velocity. Feature to measure how much code the average developer produces. This may be useful because too much lines of code added per week may result in flawed and buggy software, while too little could be a sign of inactivity. Calculated as the total diff of commits (additions-deletions) each week divided by the number of developers of those commits, averaged between the past x weeks, where x is the look-back variable. Put differently, the Developer velocity feature may be how much code the average developer produces.

External pull requests. Feature to measure the arithmetic mean of the contributors' merged pull requests made to other repositories. This may be useful because an accepted pull request is usually a sign that the contribution is deemed useful to an open source project. By measuring the average number of merged pull requests the contributors have in other repositories, you could estimate the overall experience the average contributor has. However, this feature does not take into consideration the relevance or age that experience. Calculated as the average number of merged pull requests the contributors has made to other repositories. Put differently, the External pull requests feature may be the average number of the contributors' merged pull requests made to other repositories.

Issues trend. Feature to measure the linear trend of the number of issues posted per week, that is, if the number is increasing or decreasing. This may be useful because issues are a sign of an active community. Frequent issues do not necessarily mean a defect software, but rather that the contributors are engaged in improving the open source project. The trend of issues posted per week enables you to tell if the number is increasing or decreasing. Calculated as the slope (derivative) of the linear regression line fitted to the weekly number of created issues the past x weeks, where x is the look-back variable. Put differently, the Issue trend feature may be the trend of the number of issues posted per week.

Closed issues per developer. Feature to measure the number of issues the developers have recently closed. This may be useful because it gauges how responsive the developers are to the feedback from the OSS consumers that use their open source project. Calculated as the number of closed issues past x weeks, where x is the look-back variable, divided by the number of unique developers who closed those issues. Put differently, the Closed issues per developer may be the number of issues the developers have recently closed.

Loyal developer commits. Feature to measure the number of commits loyal (long-term) contributors have recently made. This may be useful because it tells us if long-term contributors are still active or have moved on to other projects. Calculated as the number of commits past x weeks, where x is the look-back variable, made by contributors who have made at least y commits before the look-back period, where y is the threshold variable. Put differently, the Loyal developer commits feature may be the number of commits loyal contributors have recently made.

Merges trend. Feature to measure the linear trend of the number of pull requests the core team members has merged, that is, if the number is increasing or decreasing. This may be useful because normally, the core team members are the only developers who can merge pull requests. Without anyone merging pull requests, no changes can be made to the master branch. This is why it may be important to keep track of the number of merges made, and by looking at the trend we can get an idea of whether that number is improving or not. Calculated as the slope (derivative) of the linear regression line fitted to the weekly number of pull requests merged, the past x weeks, where x is the look-back variable. Put differently, the Merges trend feature may be the trend of the number of pull requests the core team member has made.

New contributors. Feature to measure the number of new contributors, who have at least one merged pull request. This may be useful because new contributors are a sign that the project is attractive to developers and leads to a more diverse community with more eyes on the code base. Calculated as the number of contributors who had their first merged pull request the past x weeks, where x is the look-back variable. Put differently, the New contributors feature may be the number of new contributors with at least one merged pull request.

Pull requests trend. Feature to measure the linear trend of pull requests created, that is, if the number is increasing or decreasing. This may be useful because pull requests are the standard way for developers to contribute to a repository. Thus, measuring the number of pull requests made is a good indicator of how active the contributors are. The trend of pull requests made per week enables you to tell if the number is increasing or decreasing. Calculated as the slope (derivative) of the linear regression line fitted to the weekly number of created pull requests the past x weeks, where x is the look-back variable. Put differently, the Pull requests trend may be the trend of the number of created pull requests.

Pull requests merged per developer. Feature to measure the arithmetic mean of merged pull requests per developer. This may be useful because it gauges the productivity of the contributors. However, a low score on this feature may also mean that the core team is not merging the pull requests that the contributors are producing. Calculated as the number of pull requests which were merged within the past x weeks, where x is the look-back variable, divided by the number of distinct developers of those pull requests. Put differently, the Pull requests merged per developer feature may be the average number of merged pull requests per developer.

Recently closed issues. Feature to measure the number of recently closed issues. This may be useful because closed issues are important to measure since it tells you if upcoming bugs, ideas and problems are being addressed by the maintainers. Calculated as the number of issues closed the past x weeks, where x is the look-back variable. Put differently, the Recently closed issues feature may be the number of recently closed issues.

Recent commits. Feature to measure the number of recent commits present on the master branch. This may be useful because commits play a central role in estimating the activity of a project. Lack of recent commits to the master branch may be a symptom of an inactive community, absent maintainers, deprecation, etc. Calculated as the number of commits in the master branch created in the past x weeks, where x is the look-back variable. Put differently, the Recent commits feature may be the number of recent commits present on the master branch.

Recent core team commits. Feature to measure the number of recent commits on the master branch, created by core team members. This may be useful because the core developers' activity is key for progress. Measuring their commits may be a good indicator of how involved they are in the project. Calculated as the number of commits created by contributors who can merge pull requests, the past x weeks, where x is the look-back variable. Put differently, the Recent core team commits feature may be the number of recent commits on the master branch, created by core team members.

Recent issues. Feature to measure the number of recently posted issues. This may be useful because issues are a sign of an active community. A lot of issues do not necessarily mean a defect software, but rather that the consumers are engaged in improving the project. Calculated as the number of issues created the past x weeks, where x is the look-back variable. Put differently, the Recent issues feature may be the number of recently posted issues.

Recent merges. Feature to measure the number of recently merged pull requests. This may be useful because normally, the core team members are the only developers who can merge pull requests. Without anyone merging pull requests, no changes can be made to the master branch. This is why it is important to keep track of the number of recent merges made. Calculated as the number of pull requests merged past x weeks, where x is the look-back variable. Put differently, the Recent merges feature may be the number of recently merged pull requests.

Recent pull requests. Feature to measure the number of recent pull requests made. This may be useful because pull requests are the standard way for developers to contribute to a repository. Thus, measuring the number of pull requests made is a good indicator of how active the contributors are. Calculated as the number of pull requests created the past x weeks, where x is the look-back variable. Put differently, the Recent pull requests feature may be the number of recent pull requests made.

Total contributors. Feature to measure the total amount of contributors of the open source project. This may be useful because a high number of total contributors is a sign of a diverse community. Calculated as the number of unique developers in the master branch commit history. Put differently, The Total contributors feature may be the total amount of contributors of the open source project.

Total forks. Feature to measure the total amount repositories that has been forked from a repository. This may be useful because a high fork count is a sign of interest from the developer community. Calculated as the total fork count. Put differently, the Total forks feature may be the total amount of repositories that has been forked from the open source project.

Total stargazers. Feature to measure the total amount of stars the repository has. Stargazers may be GitHub members that gives a star to the repository. This may be useful because GitHub members often star a repository to bookmark it as interesting. Thus, by looking at the total amount of stars one could estimate the accumulated interest a repository has. Calculated as the total star count. Put differently, the Total stargazers feature may be the total amount of stars the open source project has.

Total watchers. Feature to measure the total amount of watchers the repository has. This may be useful because when a GitHub member watch a repository, they get notifications about its activity. Since most GitHub members are unlikely to watch repositories they aren't interested in, the total watchers count is a good indicator of the current interest of a repository. Calculated as the total watchers count. Put differently, the Total watchers feature may be the total amount of watchers the open source project has.

Vulnerability Disclose to Patch. A feature describing the amount of days it takes for a vulnerability disclosed by a CVE Numbering Authority (CNA) to be patched from its disclosure. This can be negative. Put differently, the Vulnerability Disclosure to Patch feature may be the amount of days it takes for a vulnerability disclosed by a CNA to be patched.

Vulnerability Entry to Disclosure. A feature describing the amount of days it takes for a vulnerability disclosed by a CNA to be discovered from when the vulnerable code was committed. Put differently, the Vulnerability Entry to Disclosure feature may be the amount of days it takes for a vulnerability disclosed by a CNA to be discovered from when the vulnerable code was committed.

Severity Adjusted Vulnerability Disclose to Patch. A feature describing the amount of days it takes for a vulner-ability disclosed by a CNA to be patched from its disclosure, adjusted for severity of the vulnerability. This can be negative. Put differently, the Severity Adjusted Vulnerability Disclose to Patch feature may be the amount of days it takes for a vulnerability disclosed by a CNA to be patched from its disclosure, adjusted for severity of the vulnerability.

Issue Vulnerability Days Open. The average amount of days an issue classified as security related remains open. Put differently, the Issue Vulnerability Days Open feature may be the average amount of days an issue classified as security related remains open.

Issue Vulnerability Comment Rate. The average amount of comments an issue classified as security related receives from the community. Put differently, the Issue Vulnerability Comment Rate feature may be the average amount of comments an issue classified as security related receives from the community.

Issue Vulnerability Entry to Issue. The average amount of days it takes for an issue classified as security to be discovered and report it as an issue. Put differently, the Issue Vulnerability Entry to Issue feature may be the average amount of days it takes for an issue classified as security to be discovered and reported as an issue.

Vulnerability Time Series Distribution. A feature describing the fluctuation of vulnerability reports over time. We preferably want a steady flow, rather than spikes from a long time ago. Put differently, the Vulnerability Time Series Distribution feature may be the fluctuation of vulnerability reports over time.

Number of Vulnerabilities. Do we get vulnerability reports from a lot of different reporters, or are all vulner-abilities reported from the same person? It is favourable to have reports from multiple members of the community. Put differently, the Number of Vulnerabilities feature may be the number of different reporters of vulnerabilities.

Issue Vulnerability Rate. The rate of issue classified as security related, determined by the fraction of issues that are security-related. This feature is Centre Normalized. Put differently, the Issue Vulnerability Rate feature may be the rate of issue classified as security related, determined by the fraction of issues that are security-related.

Acceptable Developer Velocity. A feature describing how much developers are contributing during a time-frame. If this is too high (9th-decile or more), this feature will determine the velocity as too high and prone to security flaws. Put differently, the Acceptable Developer Velocity feature may be how much developers are contributing during a time-frame.

Repository Size. A feature describing the repository size. A larger repository may come with additional features that the OSS consumer may not make use of and increase the exposed surface of potential vulnerability entry. Put differently, the Repository Size feature may be the size of the open source project.

Repository Size Adjusted Amount of Vulnerabilities. A feature describing the amount of vulnerabilities in the project, adjusted for the repository size. This feature is Centre Normalized. Put differently, the Repository Size Adjusted Amount of Vulnerabilities may be the amount of vulnerabilities in the open source project, adjusted for the open source project size.

Repository Size Adjusted Amount of Bug Reports. A feature describing the amount of bug-reports in the project, adjusted for the repository size. This feature is Centre Normalized. Put differently, the Repository Size Adjusted Amount of Bug Reports feature may be the amount of bug-reports in the open source project, adjusted for the open source project size.

Commit Size. A feature describing the commit size of an open source project. Smaller commit-size should reduce the risk of vulnerability entry. This feature is forgiving for being average and gives worse scores if commits becomes too large on average. Put differently, the Commit Size feature may be the commit size of an open source project.

Security Processes Badges. Does the project have any security-related badges in its readme describing a good security process? This is a binary feature. Put differently, the Security Processes Badges feature may be whether any security-related badges are present in a readme file of the open source project.

Security Vulnerability Badges. Does the project have any security-related badges in its readme reporting the amount of vulnerabilities? This is a binary feature. Put differently, the Security Vulnerability Badges feature may be whether any security-related badges in the readme reporting the amount of vulnerabilities.

Issue Vulnerability Reporting. This feature describes the rate at which security related issues have CVEs linked to them. If this rate is low, it indicates that the project solves security problems without disclosing CVEs to the public, making them hard to detect for vulnerability tools. Put differently, the Issue Vulnerability Reporting feature may be the rate at which security related issues have CVEs linked to them.

Review Policy Configure. Is the project configured for a good code-entry practice among its contributors? Put differently, the Review Policy Configure feature may be whether the open source project is configured for a good code-entry practice among its contributors.

Test Coverage. A good test-coverage may contribute to better and more secure software. Put differently, the Test Coverage feature may be the quality of the test-coverage.

Core Infrastructure Initiative. A program that helps with security audits and infrastructure. Put differently, the Core Infrastructure Initiative feature may be a program that helps with security audits and infrastructure.

Mean Vulnerability Severity. Mean of the vulnerability Severity score (CVSS3). A higher severity gives a lower score, and no vulnerabilities at all gives a lower score as well. Put differently, the Mean Vulnerability Severity feature may be the average vulnerability Severity score (CVSS3).

Security Awareness. This features measures if contributors avid easily avoidable vulnerabilities, such as injections, vulnerabilities from the SANS top 25 list, and some specific CWEs. Put differently, the Security Awareness feature may be if contributors avid easily avoidable vulnerabilities.

Exploitability. A feature describing the ratio at which vulnerabilities have exploits. Put differently, the Exploitability feature may be the ratio at which vulnerabilities have exploits.

Dead Issue Rate. A feature describing the rate of stale or dead issues in the past 21 weeks. Put differently, the Dead Issue Rate feature may be the rate of stale or dead issues in the past 21 weeks.

Dead Issue Vulnerabilities Rate. A feature describing the rate of stale or dead security-related issues in the past 21 weeks. Put differently, the Dead Issue Vulnerabilities Rate feature may be the rate of stale or dead security-related issues in the past 21 weeks.

Maintainer Responsiveness. A feature describing if maintainers are responding to issues in the project. If maintainers (contributors with merge rights) are not responding to issues, this may indicate that the project is going stale. Put differently, the Maintainer Responsiveness feature may be if maintainers are responding to issues in the project.

A number of desirable practices are described in more detail below. Other practices that in some way reflect a quality aspect of an open source project are possible as well. Examples of which features that can be used to determine each practice can be seen in FIGS. 5 to 7.

Contributor Experience. This practice describes the contributor experience in a specific open source project. Experienced contributors tend to write more efficient, more secure, and usable code, and should therefore be preferred. Put differently, the Contributor Experience practice may be the contributor experience in a specific open source project. As an example, the practice Contributor Experience may be determined as a weighted sum of the features Contributor Influence and External Pull Requests Merged per Developer.

Contributor Efficiency. This practice describes the contributor efficiency in a specific open source project. Efficiency is measured by looking at the rate of which the contributors code, merge pull requests, and close issues. Put differently, the Contributor Efficiency practice may be the contributor efficiency in a specific open source project. As an example, the practice Contributor Efficiency may be determined as a weighted sum of the features Closed Issues per Developer, Pull Requests Merged per Developer and Developer Velocity.

Contributor Diversity. This practice describes the diversity in the contributing community for a specific open source project. Diversity is measured by looking at the rate new contributors, the rate of contribution per contributor, total number of contributors and the contributor trend. Put differently, the Contributor Diversity practice may be the diversity in the contributing community for a specific open source project. As an example, the practice Contributor Diversity may be determined as a weighted sum of the features Total Contributors, Contributor Trend, New Contributors, Developers per Commit and Contributor Scew.

Contributor Activity. This practice describes how active the contributors of an open source project are. The contributors are the people who contributes to the development and their activity is measured with features that analyse the current volume of commits, closed issues, and pull requests, as well as the trend of said volume. Put differently, the Contributor Activity practice may be the activeness of the contributors of an open source project. As an example, the practice Contributor Activity may be determined as a weighted sum of the features Recent Commits, Commits Trend, Recent Pull Requests, Pull Requests Trend, Recently Closed Issues and Closed Issues Trend.

Core Team Commitment. This practice describes how committed the core team is to the project. Put differently, the Core Team Commitment practice may be the commitment of the core team to the open source project. As an example, the practice Core Team Commitment may be determined as a weighted sum of the features Recent Core Team Commits, Core Team Commits Trend, Core Team Issue Closing, Recent Merges, Merges Trend and Company Involvement.

Contributor Longevity. This practice describes the longevity of the contributors. If the developers are contributing long-term, then it might be a sign that the project has been proven valuable. Put differently, the Contributor Longevity practice may be the longevity of the contributors. As an example, the practice Contributor Longevity may be determined as a weighted sum of the features Developer Lifetime and Loyal Developer Commits.

Usage. This practice describes the usage of an open source project is among open source consumers. Put differently, the Usage practice may be the usage of an open source project is among open source consumers. As an example, the practice Usage may be determined as a weighted sum of the features Total Downloads and Total Forks.

Developer Popularity. This practice describes how popular the open source projects is among the developers. More popular open source projects attract more and more skilled developers to contribute. Put differently, the Developer Popularity practice may be the popularity the open source project has among developers. As an example, the practice Developer Popularity may be determined as a weighted sum of the features Total Stargazers, Total Watchers, Contributor Influence and Contributor Trend.

Community Activity. This practice describes how active the community of an open source project is. In this case, community means both contributors and OSS consumers and the activity are measured with features that analyse the current volume of commits, issues, and pull requests, as well as the trend of said volume. Put differently, the Community Activity practice may be the activeness of the community to an open source project. As an example, the practice Community Activity may be determined as a weighted sum of the features Recent Commits, Commits Trend, Recent Issues, Issues Trend, Recent Pull Requests, Pull Requests Trend, Recently Closed Issues and Closed Issues Trend.

Ecosystem Buzz. This practice describes the buzz of a particular OSS in different parts of the ecosystem. A higher buzz implies that you as an OSS consumer will get better support from platforms such as Stack overflow. Put differently, the Ecosystem Buzz practice may be the buzz of a particular OSS in different parts of the ecosystem. As an example, the practice Ecosystem Buzz may be determined as a weighted sum of the feature Total Discussions on Stackoverflow.

Vulnerability Response. Practice describing how fast vulnerabilities are being handled in an open source project. Most of the features are measured in days, and a high score means that maintainers and contributors solve vulnerability-risks in a timely manner. Put differently, the Vulnerability Response practice may be how fast vulnerabilities are being handled in an open source project. As an example, the practice Vulnerability Response may be determined as a weighted sum of the features Vulnerability Disclose To Patch, Vulnerability Entry To Disclosure, Severity Adjusted Vulnerability Disclose To Patch, Issue Vulnerability Days Open, Issue Vulnerability Comment Rate, Issue Vulnerability Entry to Issue, Vulnerability Timeseries Distribution and Number of Vulnerabilities.

Vulnerability Entry. This practice describes how likely it is for a project to get new vulnerabilities determined by its track record. A higher susceptibility may require extra caution and monitoring. Higher score means that the project is less prone to new vulnerability entry, and a low score indicates an elevated risk. No reported vulnerabilities are considered as a trait that elevates the risk. Put differently, the Vulnerability Entry practice may be the likeliness of an open source project getting new vulnerabilities determined by its track record. As an example, the practice Vulnerability Entry may be determined as a weighted sum of the features Issue Vulnerability Rate, Acceptable Developer Velocity, Repository Size, Repository Size Adjusted Amount of Vulnerabilities, Repository Size Adjusted Amount of Bug Reports and Commit Size.

Security Best Practice. Practice describing what practical measure a project is taking to improve its security. Some of these features are binary, such as certifications. Features also covers vulnerability reporting practices and development processes. Put differently, the Security Best Practice may be what practical measure an open source project is taking to improve its security. As an example, the practice Security Best Practice may be determined as a weighted sum of the features Security Process Badges, Security Vulnerability Badges, Issue Vulnerability Reporting, Review Policy Configure, Test Coverage, Company Involvement and Core Infrastructure Initiative.

Vulnerability Severity. This practice looks into different aspects of the severity and exploitability of the known vulnerabilities in a project. It is important to avoid 'easily' avoidable vulnerabilities, and that the same type of vulnerabilities is not entered over and over again, indicating that the contributors do not learn from past experiences. Put differently, the Vulnerability Severity practice may be different aspects of the severity and exploitability of the known vulnerabilities in a project. As an example, the practice Vulnerability Severity may be determined as a weighted sum of the features Mean Vulnerability Severity, Security Awareness and Exploitability.

Security Sensitive Activity. A practice created to estimate the future risk of the project going stale, meaning that newly disclosed security vulnerabilities may not be handled. This practice looks at short term activity. This score should be high for most projects, and only low for the very worst performing projects. Put differently, the Security Sensitive Activity practice may be an estimate of the future risk of the open source project going stale. As an example, the practice Security Sensitive Activity may be determined as a weighted sum of the features Dead Issues Rate, Dead Issue Vulnerabilities Rate, Maintainer Responsiveness and Commits Trend.

A number of desirable metrics are described in more detail below. Other metrics that in some way reflect a quality aspect of an open source project are possible as well. Examples of which practices that can be used to determine a certain metric can be found in FIGS. 5 to 7.

Contributors. Open Source projects consists of contributors. When deciding what open source to bring in to your software, it may be important to inspect and analyse the contributors of a project. Put differently, the Contributors metric may be the contributors aspect of the open source project. As an example, the metric Contributors may be determined as a weighted sum of the practices Contributor Experience, Contributor Efficiency, Contributor Diversity, Contributor Activity, Core Team Commitment and Contributor Longevity.

Popularity. The popularity of an open source project may be a rather crucial indicator of the health of the project. It signifies interest from both developers and OSS consumers alike, pointing towards viability and continued development. Put differently, the Popularity metric may be the popularity aspect of an open source project. As an example, the metric Popularity may be determined as a weighted sum of the practices Usage, Developer Popularity, Community Activity and Ecosystem Buzz.

Security. The security of an open source project is important in many aspects of the software. This metric may be impactful to the risk associated with an open source project, as it measures both indicators of vulnerability entry risk, and past vulnerability response performance. This metric also takes into account the risks associated with anomalies in development speed, as well as risks associated with halts in project activity. Put differently, the Security metric may be the security aspect of the open source project. As an example, the metric Security may be determined as a weighted sum of the practices Vulnerability Response, Vulnerability Entry, Security Best Practice, Vulnerability Severity and Security Sensitive Activity.

Figure 5:
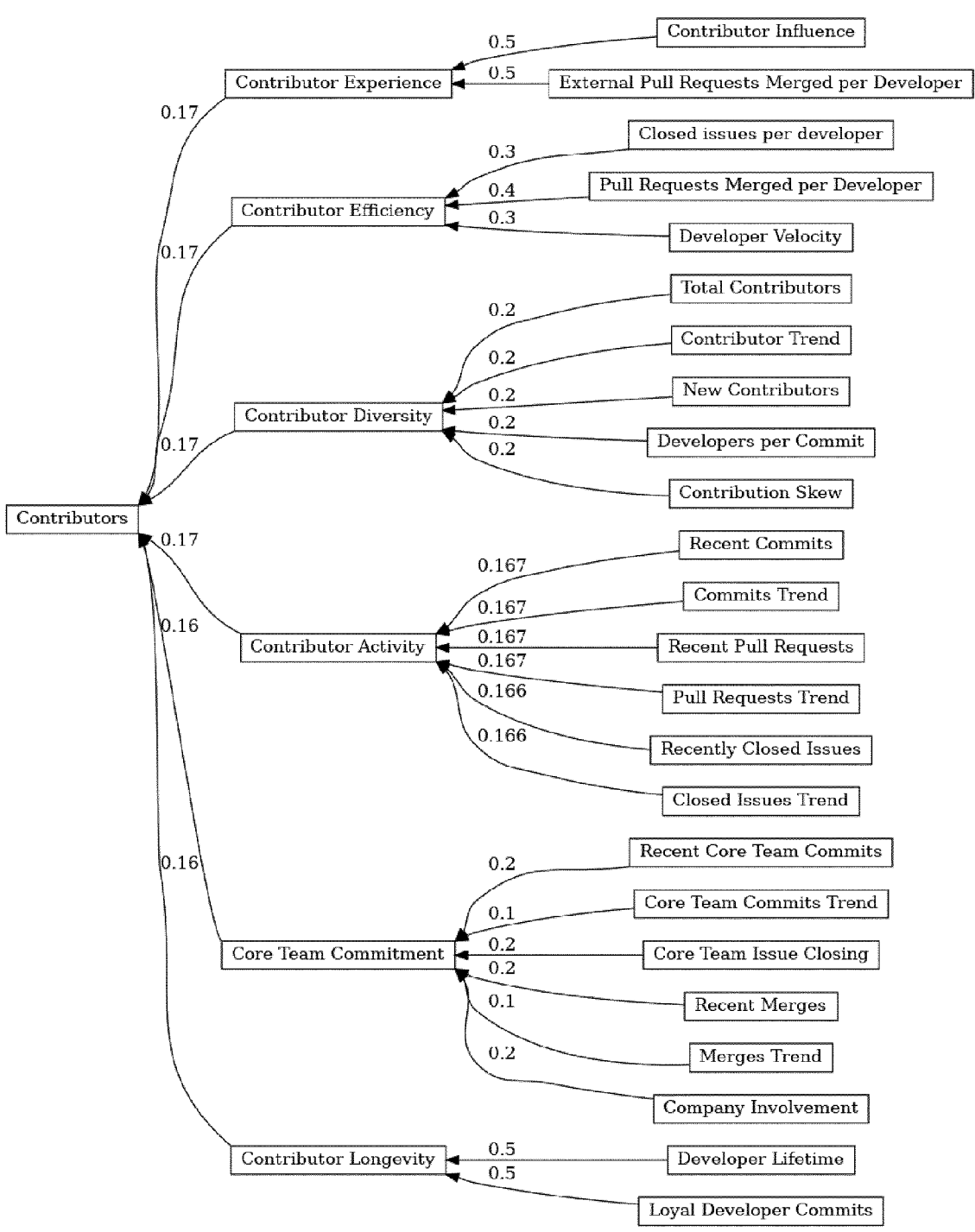
FIG. 5 illustrates an exemplary hierarchical structure of a contributor metric.

FIG. 5 illustrates an exemplary hierarchical structure of a contributor metric. It illustrates what practices contributes to the contributors metric, and what features contributes to the practices. It may be seen as an example of efficient combinations of features and practices. In this example, the contributor metric is constructed from six different practices, which in turn are constructed from different numbers of relative features. The practices that are used to determine the contributor metric are preferably related to different aspects of the contributors. In the same way, the features that are used to determine the practices are preferably related to different aspects of the contributor.

In this example, the first set of weights comprise six subsets of weights, one for each practice. The sum of weights for each subset of weights may sum to 1. Further, the second set of weights comprise six weights, one for each practice. The sum of the second set of weights may sum to 1.

A feature may contribute to multiple practices. As an example, the feature Contributor Influence may contribute to the practice Contributor Experience as well as the practice Developer Popularity. Similarly, a practice may contribute to multiple metrics.

Figure 6:
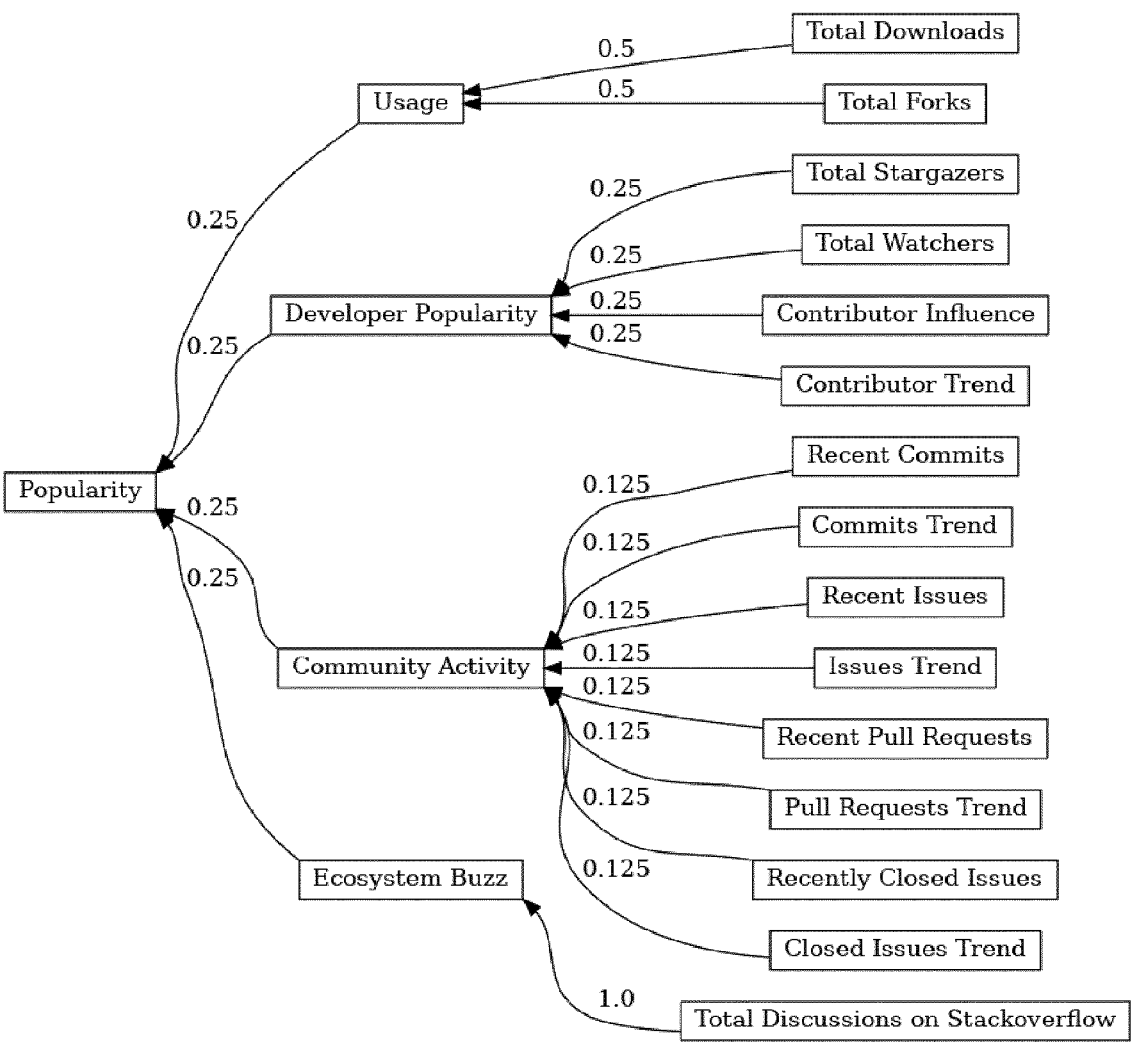
FIG. 6 illustrates an exemplary hierarchical structure of a popularity metric.

FIG. 6 illustrates a hierarchical structure by way of example of a popularity metric. It illustrates what practices contributes to the popularity metric, and what features contributes to the practices. It may be seen as an example of efficient combinations of features and practices. In this example, the popularity metric is constructed from four different practices, which in turn are constructed from different numbers of relative features. The practices that are used to determine the popularity metric are preferably related to different aspects of the popularity of the open source project. In the same way, the features that are used to determine the practices are preferably related to different aspects of the popularity.

In this example, the first set of weights comprise four subsets of weights, one for each practice. The sum of weights for each subset of weights may sum to 1. Further, the second set of weights comprise four weights, one for each practice. The sum of the second set of weights may sum to 1.

Figure 7:
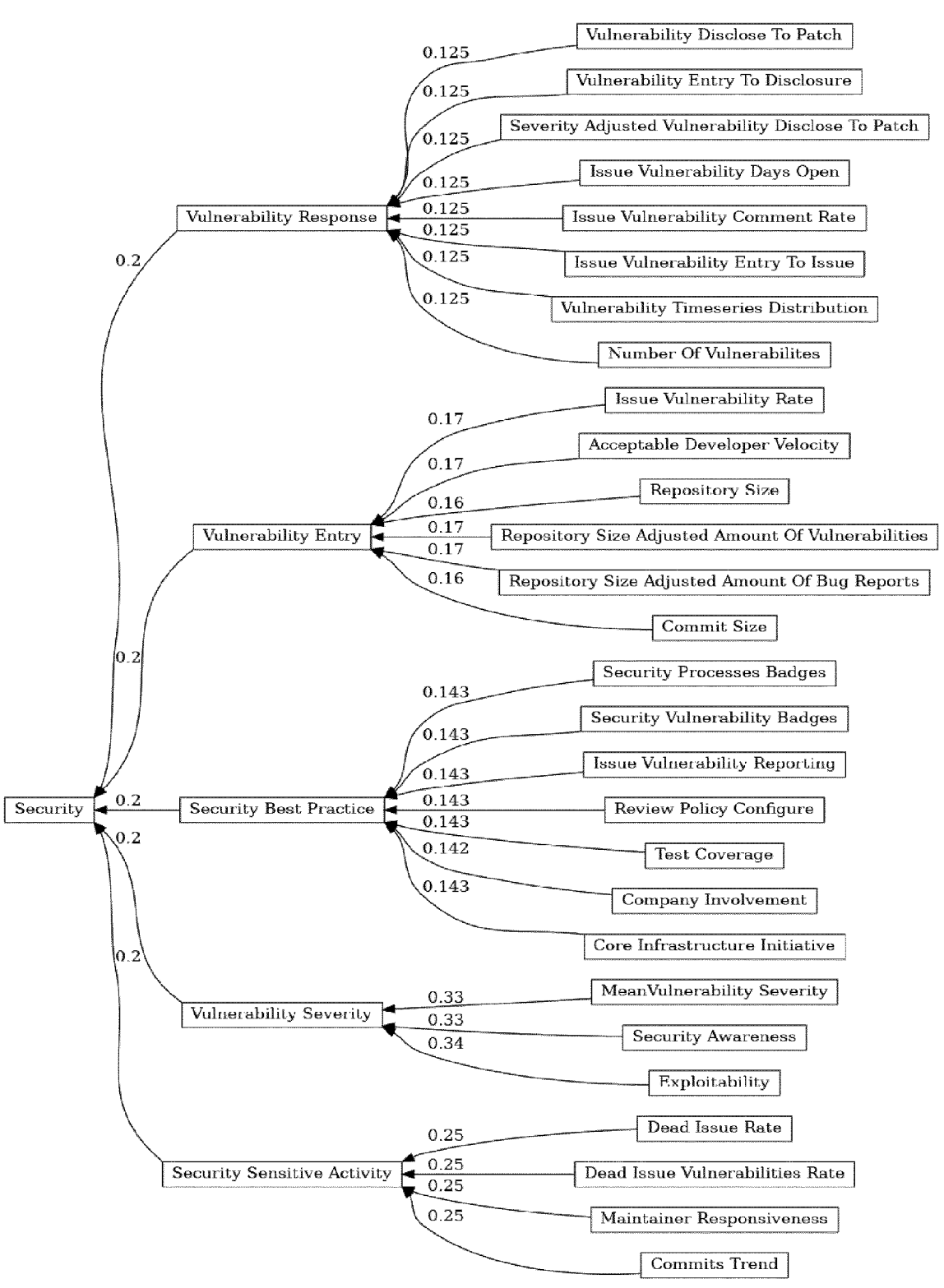
FIG. 7 illustrates an exemplary hierarchical structure of a security metric.

FIG. 7 illustrates a hierarchical structure by way of example of a security metric. It illustrates what practices contributes to the security metric, and what features contributes to the practices. It may be seen as an example of efficient combinations of features and practices. In this example, the security metric is constructed from five different practices, which in turn are constructed from different numbers of relative features. The practices that are used to determine the security metric are preferably related to different aspects of the security of the open source project. In the same way, the features that are used to determine the practices are preferably related to different aspects of the security.

In this example, the first set of weights comprise five subsets of weights, one for each practice. The sum of weights for each subset of weights may sum to 1. Further, the second set of weights comprise five weights, one for each practice. The sum of the second set of weights may sum to 1.

It should be noted that the weights shown in FIGS. 5 to 7 should be interpreted as non-limiting examples of weights. They may not reflect user preferences or a maximum variance of the practices.

From the description above follows that, although various embodiments of the disclosure have been described and shown, the disclosure is not restricted thereto, but may also be embodied in other ways within the scope of the of the subject-matter defined in the following claims.

The invention claimed is:

1. A computer-implemented method for determining one or more latent variables related to quality of a selected open source project, the method comprises, extracting, by a processor, open source project data related to the selected open source project from one or more databases, determining, by the processor, one or more absolute features from the open source project data according to pre-set rules, retrieving, by the processor, for each absolute feature, a corresponding transform related to a respective probability distribution, wherein the corresponding transform is determined based on a multitude of open source projects, a first transform corresponding to a first absolute feature of the one or more absolute features being different than a second transform corresponding to a second absolute feature of the one or more absolute features, transforming, by the processor, the one or more absolute features into one or more relative features having one or more corresponding relative feature values by the corresponding transform of each absolute feature, weighting, by the processor, the one or more corresponding relative feature values of the one or more relative features using a first set of weights, thereby forming one or more weighted relative feature values of the one or more relative features, and determining, by the processor, one or more practice values of one or more practices, each of the one or more practices being related to a quality aspect of the selected open source project, as one or more sums of combinations of the one or more weighted relative feature values of the one or more relative features.

2. The computer-implemented method according to claim 1, wherein the corresponding transform projects a corresponding absolute feature value of each absolute feature onto the respective probability distribution to transform the corresponding absolute feature value into a relative feature value of a corresponding relative feature and wherein the method further comprises, weighting, by the processor, the one or more practice values of the one or more practices using a second set of weights, thereby forming one or more practice values of one or more weighted practices, determining, by the processor, a metric, related to a quality aspect of the selected open source project, as a sum of the one or more weighted practice values.

3. The computer-implemented method according to any of the preceding claims, wherein each of the one or more relative features are scaled to a pre-determined scale.

4. The computer-implemented method according to any of claims 1 or 2, wherein the one or more absolute features are selected from a group consisting of Closed Issues Trend, Commits Trend, Company Involvement, Contribution Skew, Contributor Influence, Contributor Trend, Core Team Commits Trend, Core Team Issue Closing, Developers per Commit, Developer Lifetime, Developer Velocity, External Pull Requests, Issues Trend, Closed Issues per Developer, Loyal Developer Commits, Merges Trend, New Contributors, Pull Request Trend, Pull Requests Merged per Developer, Recently Closed Issues, Recent Commits, Recent Core Team Commits, Recent Issues, Recent Merges, Recent Pull Requests, Total Contributors, Total Forks, Total Stargazers, Total Watchers, Vulnerability Disclose to Patch, Vulnerability Entry to Disclosure, Severity Adjusted Vulnerability Disclose to Patch, Issue Vulnerability Days Open, Issue Vulnerability Comment Rate, Issue Vulnerability Entry to Issue, vulnerability Time Series Distribution, Number of Vulnerabilities, Issue Vulnerability Rate, Acceptable Developer Velocity, Repository Size, Repository Size Adjusted Amount of Vulnerabilities, Repository Size Adjusted Amount of Bug Reports, Commit Size, Security Processes Badges, Security Vulnerability Badges, Issue Vulnerability Reporting, Review Policy Configure, Test Coverage, Core Infrastructure Initiative, Mean Vulnerability Severity, Security Awareness, Exploitability, Dead Issue Rate, Read Issue Vulnerabilities Rate, Maintainer Responsiveness and any combinations thereof.

5. The computer-implemented method according to any of claims 1 or 2, wherein the one or more practices are selected from a group consisting of Contributor Experience, Contributor Efficiency, Contributor Diversity, Contributor Activity, Core Team Commitment, Contributor Longevity, Usage, Developer Popularity, Community Activity, Ecosystem Buzz, Vulnerability Response, Vulnerability Entry, Security Best Practice, Vulnerability Severity, Security Sensitive Activity and any combinations thereof.

6. The computer-implemented method according to claim 2, wherein the one or more corresponding absolute feature values are unrelated to a different open source project, wherein the one or more corresponding relative feature values are related to the different open source project, and wherein the metric is selected from a group consisting of security metric, contributor metric and popularity metric.

7. The computer-implemented method according to any of claims 1 or 2, wherein the corresponding transform is determined by, for each absolute feature, determining, by the processor, a set of absolute feature values from the multitude of open source projects, removing, by the processor outliers of the absolute feature values from the set, projecting, by the processor the absolute feature values of the set onto the respective probability distribution, and, determining, by the processor, the corresponding transform that projects the absolute feature values of the set onto the respective probability distribution.

8. The computer-implemented method according to claim 7, wherein removing outliers is performed by using the Isolation Forest method.

9. The computer-implemented method according to any of claims 1 or 2, wherein the corresponding transform is a Quantile Transform.

10. The computer-implemented method according to any of claims 1 or 2, wherein the first set of weights comprises one or more subsets of weights, wherein each subset of weights are related to one of the practices, and wherein each subset of weights are determined such that they maximize the standard deviation of respective practice based on a multitude of open source projects.

11. The computer-implemented method according to claim 2, further comprising, receiving the second set of weights from a user device, reflecting user preferences.

12. A server configured for determining one or more latent variables related to quality of a selected open source project, the server comprising a transceiver, a control unit and a memory, wherein the transceiver is configured to:

retrieve, for each of one or more absolute features, a corresponding transform related to a respective probability distribution, wherein the corresponding transform is determined based on a multitude of open source projects, a first transform corresponding to a first absolute feature of the one or more absolute features being different than a second transform corresponding to a second absolute feature of the one or more absolute features, wherein the control unit is configured to execute:

an extracting function, configured to extract open source project data related to the selected open source project from one or more databases, a first determining function, configured to determine one or more corresponding absolute feature values of one or more absolute features from the open source project data according to pre-set rules, a transforming function, configured to transform the one or more corresponding absolute feature values of the one or more absolute features into one or more absolute feature values corresponding to one or more relative features by using the corresponding transform of each absolute feature, a first weighting function, configured to weight the one or more corresponding relative feature values of the one or more relative features using a first set of weights, thereby forming one or more weighted relative feature values of the one or more relative features, and a second determining function, configured to determine one or more practice values of one or more practices, each of the one or more practices being related to a quality aspect of the selected open source project, as one or more sums of combinations of the one or more weighted relative feature values of the one or more relative features.

13. The server according to claim 12, wherein the transform function projects a corresponding absolute feature value of each absolute feature onto the respective probability distribution to transform the corresponding absolute feature value into a relative feature value of a corresponding relative feature and wherein the control unit is further configured to execute, a second weighting function, configured to weight the one or more practice values of the one or more practices, using a second set of weights, thereby forming one or more practice values of one or more weighted practices, a third determining function, configured to determine a metric, related to a quality aspect of the selected open source project, as a sum of the one or more weighted practice values.

14. A non-transitory computer-readable storage medium having stored thereon program code portions for implementing the computer-implemented method according to any of claims 1 or 2 when executed on a device having processing capabilities.

15. A system for determining latent variables related to quality of an open source project, the system comprising, a server according to any of claims 12 or 13, one or more databases, comprising open source project data, wherein the one or more databases are communicatively connected to the server.

16. A server configured for determining one or more latent variables related to quality of a selected open source project, the server comprising a transceiver, a control unit and a memory, wherein the transceiver is configured to:

retrieve, for each absolute feature, a corresponding transform related to a respective probability distribution, wherein the corresponding transform is determined based on a multitude of open source projects, wherein the control unit is configured to execute:

an extracting function, configured to extract open source project data related to the selected open source project from one or more databases, a first determining function, configured to determine one or more corresponding absolute feature values of one or more absolute features from the open source project data according to pre-set rules, wherein the one or more absolute features comprise a plurality of Closed Issues Trend, Commits Trend, Company Involvement, Contribution Skew, Contributor Influence, Contributor Trend, Core Team Commits Trend, Core Team Issue Closing, Developers per Commit, Developer Lifetime, Developer Velocity, External Pull Requests, Issues Trend, Closed Issues per Developer, Loyal Developer Commits, Merges Trend, New Contributors, Pull Request Trend, Pull Requests Merged per Developer, Recently Closed Issues, Recent Commits, Recent Core Team Commits, Recent Issues, Recent Merges, Recent Pull Requests, Total Contributors, Total Forks, Total Stargazers, Total Watchers, Vulnerability Disclose to Patch, Vulnerability Entry to Disclosure, Severity Adjusted Vulnerability Disclose to Patch, Issue Vulnerability Days Open, Issue Vulnerability Comment Rate, Issue Vulnerability Entry to Issue, vulnerability Time Series Distribution, Number of Vulnerabilities, Issue Vulnerability Rate, Acceptable Developer Velocity, Repository Size, Repository Size Adjusted Amount of Vulnerabilities, Repository Size Adjusted Amount of Bug Reports, Commit Size, Security Processes Badges, Security Vulnerability Badges, Issue Vulnerability Reporting, Review Policy Configure, Test Coverage, Core Infrastructure Initiative, Mean Vulnerability Severity, Security Awareness, Exploitability, Dead Issue Rate, Read Issue Vulnerabilities Rate, Maintainer Responsiveness and any combinations thereof, a transforming function, configured to transform the one or more corresponding absolute feature values of the one or more absolute features into one or more absolute feature values corresponding to one or more relative features by using the corresponding transform to project an absolute feature value of each corresponding absolute feature into a relative feature value of a corresponding relative feature, a first weighting function, configured to weight a corresponding relative feature value of one or more relative features using a first set of weights, thereby forming one or more weighted relative feature values of the one or more relative features, and a second determining function, configured to determine one or more practice values of one or more practices, each of the one or more practices being related to a quality aspect of the selected open source project, as one or more sums of combinations of the one or more weighted relative feature values of the one or more relative features.

17. The server of claim 16, wherein the one or more corresponding absolute feature values are unrelated to a different open source project, wherein the corresponding relative feature value is in relation to the different open source project, and wherein each of the one or more relative features are scaled to a pre-determined scale.

18. The server of claim 16, wherein a first transform corresponding to a first absolute feature of the one or more absolute features is different than a second transform corresponding to a second absolute feature of the one or more absolute features and wherein the one or more absolute features are selected from a group consisting of Closed Issues Trend, Commits Trend, Company Involvement, Contribution Skew, Contributor Influence, Contributor Trend, Core Team Commits Trend, Core Team Issue Closing, Developers per Commit, Developer Lifetime, Developer Velocity, External Pull Requests, Issues Trend, Closed Issues per Developer, Loyal Developer Commits, Merges Trend, New Contributors, Pull Request Trend, Pull Requests Merged per Developer, Recently Closed Issues, Recent Commits, Recent Core Team Commits, Recent Issues, Recent Merges, Recent Pull Requests, Total Contributors, Total Forks, Total Stargazers, Total Watchers, Vulnerability Disclose to Patch, Vulnerability Entry to Disclosure, Severity Adjusted Vulnerability Disclose to Patch, Issue Vulnerability Days Open, Issue Vulnerability Comment Rate, Issue Vulnerability Entry to Issue, vulnerability Time Series Distribution, Number of Vulnerabilities, Issue Vulnerability Rate, Acceptable Developer Velocity, Repository Size, Repository Size Adjusted Amount of Vulnerabilities, Repository Size Adjusted Amount of Bug Reports, Commit Size, Security Processes Badges, Security Vulnerability Badges, Issue Vulnerability Reporting, Review Policy Configure, Test Coverage, Core Infrastructure Initiative, Mean Vulnerability Severity, Security Awareness, Exploitability, Dead Issue Rate, Read Issue Vulnerabilities Rate, Maintainer Responsiveness and any combinations thereof.

19. The server of claim 16, wherein the one or more practices are selected from a group consisting of Contributor Experience, Contributor Efficiency, Contributor Diversity, Contributor Activity, Core Team Commitment, Contributor Longevity, Usage, Developer Popularity, Community Activity, Ecosystem Buzz, Vulnerability Response, Vulnerability Entry, Security Best Practice, Vulnerability Severity, Security Sensitive Activity and any combinations thereof and wherein the one or more practice values comprises a metric selected from a group consisting of security metric, contributor metric and popularity metric, wherein the first set of weights comprises one or more subsets of weights, wherein each subset of weights are related to one of the practices, and wherein each subset of weights are determined such that they maximize the standard deviation of respective practice based on a multitude of open source projects.

20. The server of claim 16, wherein the transforming function, for each absolute feature, determines a set of absolute feature values from the multitude of open source projects, removes outliers of the absolute feature values from the set, projects the absolute feature values of the set onto the respective probability distribution, and determines the corresponding transform that projects the absolute feature values of the set onto the respective probability distribution.

\* \* \* \* \*